United States Patent [19]

Knauff et al.

[11] Patent Number: 4,902,328

[45] Date of Patent: Feb. 20, 1990

[54] METHOD OF MANUFACTURING SHAPED BODIES FROM CERAMICS OR GLASS

[75] Inventors: Karl-Georg Knauff, Aachen; Benno Schmidl, Simmerath-Lammersdorf, both of Fed. Rep. of Germany

[73] Assignee: U.S. Philips Corporation, New York, N.Y.

[21] Appl. No.: 268,654

[22] Filed: Nov. 7, 1988

Related U.S. Application Data

[63] Continuation of Ser. No. 109,788, Oct. 16, 1987, abandoned.

[30] Foreign Application Priority Data

Oct. 22, 1986 [DE] Fed. Rep. of Germany ....... 3635842

[51] Int. Cl.$^4$ .................... C03B 37/016; C03B 19/06
[52] U.S. Cl. ................................. 65/17; 65/18.7; 65/30.1; 65/901; 264/4; 264/4.7; 264/63
[58] Field of Search ............... 65/17, 18.1, 18.2, 18.3, 65/18.4, 30.1, 31, 33, 60.1, 60.3, 111, 901; 264/4, 4.7, 63; 501/12, 128

[56] References Cited

U.S. PATENT DOCUMENTS

| | | | |
|---|---|---|---|
| 3,953,562 | 4/1976 | Hait et al. | 264/83 |
| 4,307,169 | 12/1981 | Matkan | 264/4 |
| 4,381,931 | 5/1983 | Hunold et al. | 65/18.2 |
| 4,397,666 | 8/1983 | Mishima et al. | 65/901 |
| 4,427,785 | 1/1984 | Prochazka et al. | 501/128 |
| 4,680,047 | 7/1987 | Clasen et al. | 65/18.3 |

*Primary Examiner*—Robert L. Lindsay
*Attorney, Agent, or Firm*—Norman N. Spain

[57] ABSTRACT

A method of manufacturing shaped bodies from ceramic or glass, in which a green body is formed from the starting material for the shaped body in the form of a plastic mass consisting of microdispersed solid particles and water as a dispersing liquid and, if necessary, a binder, after which said green body is dried and sintered, the still wet green body being immersed in water miscible organic liquid having a lower surface tension and a lower enthalphy of vaporization than water, until the water in the green has at least largely been replaced by the organic liquid due to diffusion.

9 Claims, No Drawings

METHOD OF MANUFACTURING SHAPED BODIES FROM CERAMICS OR GLASS

This is a continuation of application Ser. No. 109,788, filed Oct. 16, 1987 abandoned.

FIELD OF THE INVENTION

The invention relates to a method of manufacturing shaped bodies from ceramics for example glass, in which a shaped green body is formed from the starting material for the shaped body in the form of a plastic mass consisting of microdispersed solid particles and water as a dispersing liquid and, if necessary, a binder, after which the shaped green body is dried and sintered.

BACKGROUND OF THE INVENTION

Shaped bodies of ceramics or glass may be manufactured from plastic, rather viscous masses which are first shaped, then dried and subsequently sintered.

The drying of green bodies manufactured from such masses is always problematic because during the drying process these bodies are subject to contraction which leads to mechanical stresses and consequently to the formation of cracks in the shaped body. The mechanical deformation of the green body is ultimately brought about by interfacial tensions originating from liquid laminae formed between the individual solid particles of the green body in the drying process. The absolute value of the mechanical stresses is determined by the concentration gradient of the liquid phase, which is formed in the drying process, and by the value of the interfacial-(surface)-tensions. Thus, to prevent the formation of cracks in the drying process it is generally required to conduct this process as slowly as possible, i.e., to aim at the smallest possible concentration gradients of the liquid phase.

In the art of ceramics the requirements to avoid dryingcracks are generally hard to fulfil. A slow drying process requires, for example, a substantial expenditure.

SUMMARY OF THE INVENTION

It is an object of the invention to provide a method of manufacturing moulded bodies from ceramics for example glass, by means of which green bodies containing water as a dispersing liquid can be dried rapidly, and by means of which the risk of crack formation in the drying process can be substantially reduced.

This object is achieved according to the invention, in that the still wet shaped green body is immersed in a water-miscible organic liquid having a lower surface tension as well as a lower heat of vaporization than water until the water present in the green body has at least been substantially replaced by the organic liquid due to diffusion.

DETAILED DESCRIPTION OF THE INVENTION

According to advantageous embodiments of the inventive method, ethanol or dimethyl ketone (acetone) are used as organic liquids replacing the water used as a dispersing liquid in the plastic mass. In this process the aqueous phase in the immersed green body is replaced by the organic phase, due to diffusion, without producing forces which lead to the formation of cracks owing to surface tensions, because in this liquid substitution process there are no interfaces between a gaseous and a liquid phase, as is the case, for example, in a drying process in air. The subsequent drying process of the green body proceeds more rapidly than in the case of a hydrous green body as the organic liquid replacing the water in the green body has a smaller enthalpy of vaporization, and the harmful mechanical stresses produced in the green body in this process are also smaller because of the reduced surface tension of the organic liquid replacing the water in the green body.

According to further advantageous embodiments of the inventive method water-soluble organic polymers, in particular methyl cellulose or polyvinyl alcohol are used as binders for the plastic mass. Such binders are difficult to dissolve in the liquid phase in the green body according to the invention, which liquid phase is in the form of an organic liquid having a lower surface tension and a lower enthalpy of vaporization than water. In this case precipitation of the binder takes place during the water substitution by means of diffusion, such that hardening and solidification of the green body already takes place in the wet, still immersed condition. Owing to the precipitated binder the green body has already stabilized to such an extent that, in general, no crack formation takes place in the subsequent drying process. The results described herein can be checked by dilatometrically measuring the contraction.

The method according to the invention has the advantage that when green bodies from microdispersed aqueous suspensions are introduced into the organic liquid they do not contract, and even exhibit a slight expansion when they additionally contain a binder. Even green bodies having a low solids concentration exhibit a contraction during the substitution of water by the organic liquid which is only a fraction of the overall contraction in the drying process.

Preferably the microdispersed solid particles are $SiO_2$ particles having a diameter of from 10–500 nm, preferably 15–200 nm with an average particle diameter of 40 nm.

In a very useful embodiment the shaped body is an extruded mass, in which, prior to immersion in the water, the weight ratio of solid dispersing liquid binder mixture is from 1:05 to 1:0.7.

The following specific examples describe the manufacture of glass bodies according to the invention of the method. The method according to the invention can, of course, also suitably be used for the manufacture of shaped bodies which are manufactured from plastic ceramic masses having water as a dispersing liquid, and, if necessary, a binder, after which they are dried and sintered.

EXAMPLE I

A homogenized extrusion mass comprising 63% by weight of microdispersed $SiO_2$ particles having an average grain diameter of 40 nm, 4.6% by weight of a binder, in this case polyvinyl alcohol, and 32.8% by weight of water as a dispersing liquid are extruded from an extruder at a rate of 1.5 m/min and at a pressure of 160 bar into a cylindrical vessel containing an organic liquid to replace the water in the green body. In this specific example the extruded green body is a tube having an outside diameter of 30 mm and a wall thickness of 5 mm, and the organic liquid used to replace the water is ethanol. In the case of the said tube dimensions the dwell time necessary for the alcohol-water substitution is approximately 2 hours. Subsequently, the shaped body can be dried further in air without the danger of crack formation. The drying times are dependent upon the temperature and the degree of air movement. Typically, when water has been replaced by ethanol the drying time amounts to only ¼ of that of an untreated sample in which the water it contains is not replaced.

In order to obtain a very pure quartz-glass body the dried green body is heated to a temperature of 800° C. for 100 minutes, and to remove any impurities it is subjected to an $O_2$ gas flow which is saturated with $SOCl_2$ for 1.5 hours. The subsequent sintering process is carried out in a helium atmosphere to which 2% by volume of chlorine gas has been added at a temperature of 1500° C., the green body being led through the oven at a rate of 10 mm/min. In this way a transparent straight glass tube having an outside diameter of 24 mm and a wall thickness of 4 mm was obtained, said glass tube containing impurities, in particular water and transition metals, in a quantity <55 ppb. The glass body had a density of 2.20 g/cm$^3$ and a refractive index $n_D = 1.4591$, and it was free of bubbles and reams. It is also possible to use, for example, methyl cellulose as a binder.

EXAMPLE II

An extrusion mass manufactured as described in example I is compressed to form a tube as described in example I. Dimethyl ketone (acetone) is used as an organic liquid replacing the water in the green body. In this case the drying time of the green body is reduced by a factor of $\approx 8$ in comparison with a test in which the water contained in the green body was not replaced by an organic liquid having a lower surface tension and a lower enthalpy of vaporization than water. The further process steps in the manufacture of a very pure glass tube which is free of bubbles and reams correspond to those described in example I.

The glass bodies that can be manufactured by means of the method according to the invention are particularly suitable for the manufacture of preforms for optical waveguides of quartz glass. Optical waveguides have a wide range of application, they are used, for example, in light-transmission arrangements or in light-transmission systems such as optical communication systems, and they are predominantly made of an almost anhydrous type of glass which has a high silicon-dioxide content (which, if required, contains a dopant for adjusting the refractive index of the glass).

Types of glass which can suitably be used for the manufacture of optical waveguides can also advantageously be used for the manufacture of lamp envelopes for halogen lamps or gas-discharge lamps, because these types of glass, like the ones used for optical waveguides, must be substantially anhydrous and exhibit a high silicon-dioxide content.

Since the present method enables water, which is necessary as a dispersing liquid for the preparation of the starting masses used for the manufacture of such glass bodies, to be almost entirely substituted by an inorganic liquid (i.e., removed) at an early stage in the process but after forming the green body very pure special types of glass for the above-described applications can be produced very advantageously.

What is claimed is:
1. A method of manufacturing a shaped ceramic body comprising:
   (a) shaping into a desired shape a wet green body formed of a plastic mass comprising microdispersed solid particles and water as a dispersing liquid;
   (b) immersing said shaped wet green body in a water-miscible organic liquid having a lower surface tension and a lower heat of vaporization than water, until the water in the green body has at least been substantially replaced by the organic liquid, and then
   (c) drying and sintering said shaped body.
2. A method as claimed in claim 1, wherein ethanol is used as the organic liquid.
3. A method as claimed in claim 1, wherein dimethyl ketone is used as the organic liquid.
4. A method as claimed in claim 1, wherein $SiO_2$ particles having a diameter in the range from 10 to 500 nm, having an average particle diameter of 40 nm are used for the manufacture of the plastic mass.
5. A method as claimed in claim 1, wherein the shaped green body is an extruded mass having a solid:-dispersion liquid/binder weight ratio from 1:0.5 to 1:0.7.
6. A method as claimed in claim 1, wherein water-soluble organic polymers are used as binders for the plastic mass.
7. A method as claimed in claim 6, wherein methyl cellulose is used as a binder for the plastic mass.
8. A method as claimed in claim 6, wherein polyvinyl alcohol is used as a binder for the plastic mass.
9. The method of claim 1 wherein the plastic mass also comprises a binder.

* * * * *